United States Patent

[11] 3,634,136

[72] Inventors Franklin J. French
La Habra;
Dominic C. Mitchell, Arcadia, both of Calif.
[21] Appl. No. 831,549
[22] Filed June 9, 1969
[45] Patented Jan. 11, 1972
[73] Assignee North American Rockwell Corporation

[54] FLAME RESISTANT SILICONE COMPOSITION
1 Claim, 1 Drawing Fig.
[52] U.S. Cl. .................................................. 117/224,
117/128.4, 117/161 ZA, 117/232
[51] Int. Cl. ..................................................... B44d 1/42,
C09k 3/28
[50] Field of Search ......................................... 117/230,
232, 128.4, 135.1, 136, 138; 252/7, 8.1; 106/15 FP

[56] References Cited
UNITED STATES PATENTS

| | | | |
|---|---|---|---|
| 2,624,777 | 1/1953 | Abbott et al. .................. | 117/136 |
| 3,006,787 | 10/1961 | Blewis et al. .................. | 117/232 |
| 3,141,850 | 7/1964 | Lybeck .......................... | 117/232 |
| 3,179,589 | 4/1965 | Lobos ............................ | 252/7 |
| 3,238,129 | 3/1966 | Veltman ........................ | 252/7 |
| 3,477,869 | 11/1969 | Butler et al. ................... | 117/75 |
| 3,519,697 | 7/1970 | Price et al. .................... | 117/232 |

OTHER REFERENCES

Dolan, J. E., " The Effect of Sodium Bicarbonate on the Combustion of Cellulosic Materials," Chemistry and Industry, Apr. 26, 1952, pp. 368 and 371.

Wood, William G. and Joseph G. Whiten, " Boron Compounds as Fire Retardants in Coating Materials," June 3, 1968, pp. title 1, 2 and 4.

*Primary Examiner*—William D. Martin
*Assistant Examiner*—Raymond M. Speer
*Attorneys*—William R. Lane, Allan Rothenberg and Richard D. Seibel

ABSTRACT: A silicone elastomer having from 50 to 180 parts by weight of sodium bicarbonate is cured at a temperature below the decomposition temperature of sodium bicarbonate so as to produce a dense, rubberlike material for moldings and coatings of metal which have substantial flame resistance, even in an atmosphere of pure oxygen.

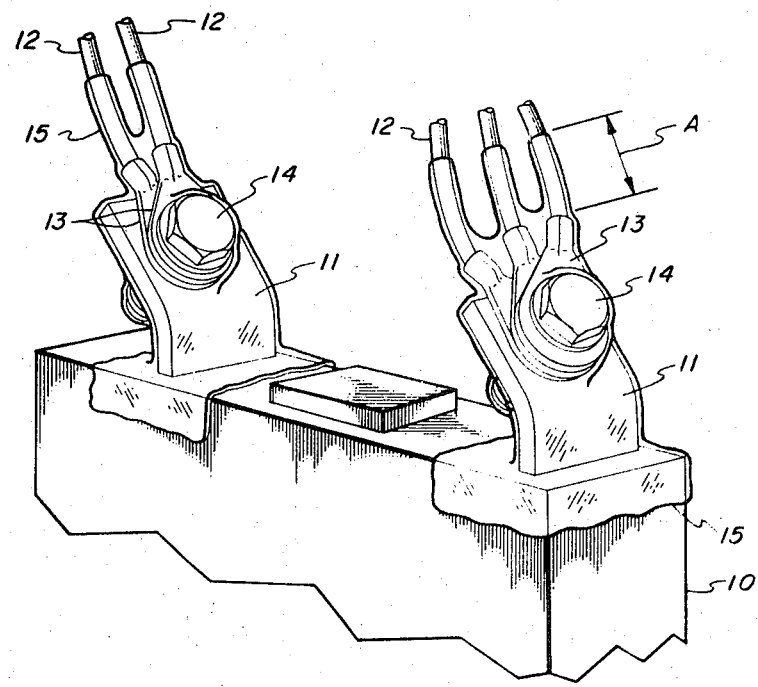
INVENTORS.
FRANKLIN J. FRENCH
DOMINIC C. MITCHELL JR.
BY Richard D. Seibel
ATTORNEY

FLAME RESISTANT SILICONE COMPOSITION

BACKGROUND

The invention described herein was made in the performance of work under a NASA Contract and is subject to the provisions of Section 305 of the National Aeronautics and Space Act of 1958, Public Law 85-568 (72 Stat. 435; 42 U.S.C. 2457).

A number of common silicone rubbers and silicone resins have been employed in high-temperature applications and other environments where more common rubberlike materials have been employed. The silicone compounds are more resistant to elevated temperatures than many carbon base organic compounds and therefore have found applicability in a broad spectrum of uses. Silicone compounds are readily available in the form of oils, greases, waxes, lubricants, elastomers and resins. Many of the silicone resins have elastomeric properties and are similar to the so-called silicone rubbers. The principal differences lie in the cross linking occurring upon curing of the rubbers and resins and the exact chemical nature of the silicone compounds is of no great significances in practice of this invention. In general, this invention is concerned with the silicone rubbers and resins which form solid rubberlike bodies upon curing irrespective of the curing mechanisms.

A substantial variety of silicone resins, curing agents, and composition modifications useful in practice of this invention are well known. Thus, for example, a number of applicable silicone compounds curable into solid elastomeric bodies are described in U.S. Pat. Nos. 3,032,531; 3,086,954; 3,109,826; 3,133,891; 3,137,670; 3,165,494; 3,183,205; 3,184,427; 3,202,634; 3,205,197; 3,219,726; 3,231,527; 3,231,542.

Despite the high temperature capability of the silicone elastomers it has been found that they will burn under certain conditions, particularly when exposed to very high temperatures in an atmosphere of pure oxygen. It is apparent that in many environments it is desirable to reduce the rate of burning of any material of construction.

SUMMARY OF THE INVENTION

Thus in the practice of this invention, according to a preferred embodiment, there is provided a low flammability composition comprising a silicone elastomer having uniformly distributed therein sodium bicarbonate powder in the range of from about 50 to 180 parts by weight relative to 100 parts of the silicone elastomer.

DRAWING

Objects and many of the attendant advantages of this invention will be readily appreciated as the same becomes better understood by reference to the following detailed description when considered in connection with the accompanying drawing wherein an electrical component is illustrated with conductors coated with the composition of this invention.

DESCRIPTION

In the compounding of silicone elastomers many fillers in powdered form have been employed for strengthening the composition or otherwise varying properties. Thus, for example, in the silicone elastomers just as in the usual organic rubberlike materials, carbon black, titanium dioxide, zinc oxide and colloidal silica have been used as fillers. These fillers are substantially inert insofar as they affect the flammability of the silicone elastomer. They merely serve as nonflammable diluents of the silicone elastomer and on that basis they do tend to somewhat reduce the rate of flame propogation.

A material that has not been employed as a filler in silicone elastomers is sodium bicarbonate. Sodium bicarbonate has been employed in small quantities wherein it reacts with acidic material in a rubber composition or decomposes below the curing temperatures to produce a foam or sponge rubber product. In such a situation the sodium bicarbonate is only temporarily present in the uncured elastomer and the compound is deliberately decomposed prior to the completion of curing to introduce bubbles in the cured product. The cured product is therefore substantially free of sodium bicarbonate. In the practice of this invention, on the other hand, sodium bicarbonate in relatively large quantities is incorporated as a filler in a silicone elastomer and remains as sodium bicarbonate in the cured product. The resultant rubberlike material has wide utility since it is flame resistant, has good mechanical properties, presents no curing problems, is adherent to numerous substrates, and otherwise resembles rubberlike composition. material has wide utility since it is flame resistant, has good mechanical properties, presents no curing problems, is adherent to numerous substrates, and otherwise resembles rubberlike compositions.

The drawing illustrates an electrical component coated with an insulating coating incorporating the principles of this invention. As illustrated in this embodiment there is provided an electrical apparatus 10 such as a circuit breaker, switch, lamp, relay, terminal strip or the like. A pair of conductive electrical leads 11 extend out of the case of the electrical apparatus 10 and in this embodiment a plurality of insulated wires 12 with conventional crimped terminals 13 are fastened to the leads 11 by bolts 14.

A coating 15 of a silicone elastomer incorporating the principles of this invention is applied over the exposed metal portions of the leads 11, terminals 13, and bolts 14. In addition, the coating extends over a portion of the case of the electrical device 10 and for a distance A along the insulated portion of the wires 12. Typically the thickness of the coating would be in the range of from about 0.05 to 0.06 inch. In a typical embodiment the extent A of insulation along the wires is a minimum of one-half inch so as to absolutely assure that no metal is exposed for electrical shorting. In the drawing the coating 15 has been drawn as if transparent so that the terminals, bolts, etc., beneath the coating would be clear. It will be apparent to one skilled in the art, however, that a silicone elastomer coating prepared according to the principles of this invention is opaque and would actually hide the details of the electrical components beneath the coating.

The composition as provided in the practice of this invention may also be employed as a molded article of substantially any shape or geometry in which elastomers can be found. The silicone rubbers and resins do not cure by a condensation type of reaction and therefore there is no problem in making molded articles in large sizes or in closed molds. Conventional casting or injection molding techniques may also be employed for making articles of a composition as provided in the practice of this invention.

As pointed out hereinabove substantially any of the large variety of silicone rubbers and silicone resins producing elastomeric products is useful in practice of this invention. The silicone elastomer employed need only be curable at a temperature substantially below the decomposition temperature of sodium bicarbonate and be substantially free of acid so that sodium bicarbonate remains dispersed in the cured dense product. The silicone elastomers cure in the same manner with or without the sodium bicarbonate, indicating that the exact nature of the silicone is immaterial so long as it does not react with the sodium bicarbonate at or below the curing temperature.

In the usual situation acid free silicone rubbers and silicone resins are employed as two component mixtures; that is, the silicone compound is a liquid, paste, or gum prior to "vulcanization" and this uncured compound is mixed with a curing agent or catalyst just prior to the curing cycle, which may occur at room temperature or at a somewhat elevated temperature. Normally the proportion of curing agent or catalyst is in the range of from about one-half to ten percent of the weight of silicone liquid, gum, or resin. A broad variety of suitable curing agents, catalysts, and the like for silicone elastomers and resins are described in the aforementioned U.S. Patents and in a significant number of other patents, books, and articles concerning silicone elastomers.

The silicone elastomer may comprise any of a number of silicone rubbers and resins such as are cured from dimethyl siloxane, methyl phenyl siloxane, or diphenyl siloxane. Such materials are curable at room temperature or moderately elevated temperatures by tin octoate, dicumyl peroxide, or the like, to produce a rubbery material known as silicone rubber.

The nature of the curing agent is not significant in practice of this invention since it does not react with the sodium bicarbonate. In addition, if desired, inert or reactive liquid diluents or solvents may be employed with the silicone elastomer in the uncured condition for varying the viscosity thereof as is well known to those skilled in the art. The only silicone elastomers known to be unsuitable are premixed compositions whose cure is inhibited by acetic acid. These are not useful in practice of this invention since the acid decomposes the sodium bicarbonate and the cured product is not dense or free of bubbles.

It is preferred that the sodium bicarbonate be present in the composition as a relatively fine powder, preferably with more than half of the sodium bicarbonate having a particle size less than about 100 microns, and be present in the silicone elastomer in the range of from about 50 to 180 parts by weight relative to 100 parts by weight of the cured silicone elastomer, that is, including both the uncured silicone liquid or gum and the conventional curing agent therefore.

When the sodium bicarbonate is present in a proportion less than about 50 parts by weight relative to 100 parts of silicone elastomer, the burn rate in a pure oxygen environment may be greater than about 0.1 inch per second which is conventionally accepted as an upper limit for a material for widespread use in an environment of 100 percent oxygen. The mode of testing to establish a burn rate is described in greater detail hereinafter.

When the quantity of sodium bicarbonate in the silicone elastomer exceeds about 180 parts by weight relative to 100 parts of the silicone elastomer the resulting composition is relatively dry and crumbly in the uncured condition and is therefore difficult to use as a coating or for molded parts. Molded parts with greater than about 180 parts sodium bicarbonate per 100 parts silicone elastomer have relatively low strength when cured and are generally not suitable for most applications.

It is particularly preferred that the composition provided in practice of this invention contain sodium bicarbonate powder in the range of from about 90 to 165 parts by weight relative to 100 parts of a silicone elastomer curable at a temperature substantially below the decomposition temperature of the sodium bicarbonate and substantially free of acid.

When the proportion of sodium bicarbonate is greater than about 90 parts by weight relative to 100 parts by weight of silicone elastomer the principal portion of flame protection has been obtained and the uncured composition has a viscosity suitable for use in a wide variety of applications including coatings and molded parts. When the proportion of sodium bicarbonate exceeds about 165 parts by weight relative to 100 parts by weight of silicone elastomer the uncured composition is relatively stiff or viscous and must be forced into position by appreciable pressure such as by injection molding equipment or, if applied by hand, by a stiff spatula. Most of the flame resistant properties have been achieved with a composition having 165 parts by weight of sodium bicarbonate and compositions below this particularly preferred limit are more readily handled in conventional molding and coating equipment.

It is preferred that sodium bicarbonate be thoroughly mixed with the uncured silicone elastomer prior to mixing of the curing agent or catalyst therewith. This permits premixing and storage of the silicone and sodium bicarbonate mixture for substantial times prior to use and permits the economy of mixing large batches. Obviously the two components of the elastomer and the sodium bicarbonate can be mixed simultaneously if desired, however, more uniform mixing is generally produced by premixing the sodium bicarbonate, alone or with small quantities of other fillers such as colloidal silica or carbon black, with the uncured silicone prior to addition of the curing agent. The sodium bicarbonate is conveniently added to the silicone on a roll mill in substantially the same manner that paint pigments are blended. This treatment tends to break up agglomerations of sodium bicarbonate particles and gives a better product than mere hand mixing of the sodium bicarbonate with the silicone elastomer. The uncured silicone elastomer with sodium bicarbonate mixed therein often has a viscosity approximating that of putty and upon addition of the curing agent a substantial reduction in viscosity occurs so that in the lower sodium bicarbonate concentration ranges the uncured composition is pourable for filling mold cavities or for brushing onto electrical components for forming an insulating coating. Higher concentrations of sodium bicarbonate in the preferred range form stiffer uncured mixtures and molding equipment or other pressure techniques are preferred for application.

Since the sodium bicarbonate is substantially inert relative to the silicone resin or rubber at room temperature and all other temperatures substantially below the decomposition temperature of the sodium bicarbonate, the conventional curing cycles for the silicone resin may be employed. Thus, for example, a few hours at room temperature may suffice for certain so-called room temperature vulcanizing silicone rubbers and the like, or curing at 150° F. for an hour or more may be applied for some of the silicone resins. It is apparent that a substantial variety of cure cycles are employed for the various silicone elastomers and curing agents useful in practice of this invention and these conventional cure cycles are substantially unaltered by addition of sodium bicarbonate to the silicone elastomer prior to curing.

In addition to sodium bicarbonate in the composition small quantities of other fillers may be employed. Thus, for example, colloidal silica may be employed in the composition to enhance the tensile and tear strength. Similarly, finely ground asbestos has been found to contribute to the strength. A small proportion of hollow glass microspheres or microballoons may be added to the composition for reducing the density where this is a significant factor. Addition of any of these materials along with the sodium bicarbonate still results in a white product upon curing and various colored pigments may be added for overall or localized coloring. If light colors are not of significance it will be apparent that quantities of carbon black may also be added to the elastomer along with the sodium bicarbonate for enhancing the strength. Generally it is preferred that the quantity of other fillers added to the silicone elastomer be less than about 20 percent by weight so that significant ability to retard flaming is retained.

In a typical embodiment commercially available Dow-Corning 93–072 RTV (room temperature vulcanizing) silicone rubber has sodium bicarbonate mixed therewith for producing a composition according to the principles of this invention. In a typical embodiment 10 parts by weight of sodium bicarbonate is mixed into 10 parts by weight of the base portion of the silicone rubber. After thorough mixing 1 part by weight of catalyst is thoroughly mixed into this mixture, preferably for at least 5 minutes, and the resultant mixture is placed in a vacuum chamber and deaerated in a vacuum of at least 29 inches of mercury until it has expanded and returned to substantially its original volume indicating that substantially all of the entrained gases have been removed from the mixture. The mixed material should be used as soon as possible after mixing since the maximum working time or pot life of the catalyzed mixture is approximately 2 hours at room temperature.

The mixed material may then be cast into a mold or applied to electrical conductors as illustrated in the drawing by means of a spatula or stiff brush. The silicone rubber cures in about 24 hours at room temperature, however, it is preferred to maintain the composition at about 150° F. for about 24 hours to assure that complete curing of the rubber has occurred. In the alternative, curing may be accomplished in about two hours at 300° F. It will be apparent to one skilled in the art that other cure cycles may be employed if desired.

In another embodiment 180 grams of sodium bicarbonate is thoroughly mixed into 100 grams of Dow-Corning 93-072 RTV silicone rubber base. After thorough mixing, 10 grams of the 93-072 curing agent is mixed in and the material is outgassed in vacuum and forced into a closed plastic mold, the surfaces of which have been coated with a suitable parting or release agent. (A suitable release agent comprises a solution of about two to five percent of an ordinary household detergent in water which is permitted to dry on the surface.) The composition in the mold is then heated to about 150° F. for at least an hour which causes the silicone rubber to set. If desired, the molded part can then be removed from the mold and heated (at 150° F. for example) for approximately another 24 hours to absolutely assure that a complete cure has occurred. In one typical situation sheets 6 inches by 6 inches by ⅛ inch were so molded in closed plastic molds and after curing these sheets were cut into pieces 2½ by 5 by ⅛ inch for burn testing.

In a typical burn test a 2½ by 5 inch piece of such a sheet is clamped between ¼ inch metal bars extending along each edge to leave an exposed test region 2 by 5 inches. Such a specimen is mounted with the long dimension extending vertically in a burn test chamber. A quarter inch diameter heater coil is arranged along the top edge of the burn specimen and the chamber filled with a gas representing a selected test environment. Thus, for example, the burn test chamber may be filled with oxygen at a pressure of 16.5 p.s.i.a., that is, pure oxygen at a slight pressure above atmospheric. The wire heater coil is then heated to about 2,000° F. and maintained at that temperature until substantial ignition occurs in the test material or for a maximum of about 15 minutes if no ignition occurs. In some tests a sheet of tissue paper is placed in the coil to initiate flaming, or a cylindrical piece of flammable material may be used to increase the heat flux.

In one series of such burn tests specimens 2½ by 5 by 0.167 inch were tested in 16.5 p.s.i.a. oxygen. Ignition proved to be difficult and after ignition the combustion rate averaged only about 0.0081 inch per second. The same material without addition of sodium bicarbonate in a similar test showed a burn rate of about 0.35 inch per second. It is apparent that a substantial decrease in burn rate was obtained and it was also noted that a substantial decrease in smoke and soot was obtained by addition of sodium bicarbonate to the silicone rubber.

In another test series 108 grams of sodium bicarbonate powder was mixed into 60 grams of Dow-Corning 93-072 RTV silicone rubber and 6 of curing agent was mixed therein. After curing at 150° F. for 24 hours sheets 2½ by 5 by 0.150 inch thick were burn tested in 16.5 p.s.i.a. oxygen. It was found with these specimens that no ignition of the specimen could be obtained with the heater coil at the top edge of the specimen in 15 minutes. The heater coil was then arranged at the bottom edge of the specimen to induce ignition and an average combustion rate of only 0.042 inch per second was observed.

This same formulation was formed in sheets about 0.09 inch thick and the mechanical properties thereof were measured. A durometer hardness of 82 was observed in all specimens and an elongation of 175 to 200 percent was measured in tensile tests. A tensile strength of from 176 to 202 pounds per square inch was measured and an average tear strength of 32.6 pounds per inch was also measured.

Other flame resistant silicone elastomer compositions have been made and tested. Thus, for example, commercially available silicone rubbers and silicone resins of various types have been compounded in their conventional manner with sodium bicarbonate included in the composition. Typical of such silicone rubbers and silicone resins are RTV 560 and RTV 577 available from General Electric Company, Schenectedy, N.Y. A blend of 85 percent RTV 560 and 15 percent RTV 577 formulated with sodium bicarbonate showed good flame resistance and mechanical properties. Another silicone compound which has been mixed with sodium bicarbonate and tested is available from Dow-Corning Corporation, Midland, Mich., under their trade designation Sylgard 187, which is a room temperature curing silicone resin having good mechanical and electrical properties.

Silicone elastomer gums may also be employed such as SE 404; SE 505; SE 701; SE 4511; and SE 4611, all available from General Electric Company or Silastic 35U available from Dow Corning. Other suitable silicone elastomers available from Dow Corning under the Silastic mark are DC-52, and DC-82. A significant number of other substantially acid free silicone elastomers curable at a temperature below the decomposition temperature of sodium bicarbonate are available from E. I. duPont de Nemours and Company, Wilmington, Del.; and Union Carbide Corporation, Niagara Falls, N.Y.; as well as Dow-Corning and General Electric. Union Carbide silicone elastomers include their compositions K-1347 and K-1205.

The following table sets forth several compositions of silicone elastomers incorporating sodium bicarbonate in a dense cured product according to the principles of this invention. This table sets forth the commercially available silicone elastomer employed in the tests with the trade designations hereinabove identified. The quantity of powdered sodium bicarbonate incorporated in the dense cured resin is set forth in the table as a percentage of weight of silicone elastomer including both the base and the curing agent, that is, for example, when the table states that 60 percent sodium bicarbonate is employed this indicates that there are 60 parts by weight of sodium bicarbonate per 100 parts by weight of silicone elastomer. In some of the compositions set forth in this table a quantity of hollow glass microspheres or microballoons is included in the composition with the weight of microballoons stated in the same terms as the weight of sodium bicarbonate, that is, in parts by weight per hundred parts of silicone elastomer. The table also sets forth the burn rate or combustion rate for these compositions with flame propagating from the top down as hereinabove described.

TABLE

| Silicone Elastomer | Sodium Bicarbonate (% of silicone) | Hollow Glass microspheres (% of silicone) | Burn Rate (in./sec.) |
| --- | --- | --- | --- |
| RTV 560 | — | — | 0.09 |
| Sylgard 187 | — | — | 0.31 |
| 93-072 | — | — | 0.35 |
| RTV 560 | 60 | — | 0.027 |
| RTV 560 | 90 | — | 0.017 |
| RTV 560 | 80 | 5 | 0.025 |
| Sylgard 187 | 90 | — | 0.056 |
| Sylgard 187 | — | 90 | 0.18 |
| 93-072 | 94 | — | 0.01 |
| 93-072 | 109 | — | 0.018 |
| 93-072 | 164 | — | 0.008 |
| 93-072 | 35 | 15 | 0.15 |
| 93-072 | 30 | 10 | 0.2 |
| 93-072 | — | 30 | 0.3 |

It can be seen from the table that addition of substantial quantities of sodium bicarbonate to a silicone elastomer substantially reduces the combustion rate when tested in an environment of 16.5 p.s.i.a. oxygen. It can also be seen that the substantially inert filler of hollow glass microspheres reduces the burn rate as compared with the silicone elastomer alone but this filler is much less effective than sodium bicarbonate.

In another test, strips 1 inch wide, 6 inches long, and about 0.85 inch thick were molded and burn tested in air. Thus, for example, in parallel tests strips were made of Dow Corning 93-072 silicone elastomer alone and the same elastomer with 180 parts by weight of sodium bicarbonate per 100 parts by weight of resin. These strips were made in a closed mold and cured for 72 hours at room temperature. Thereafter the strips were held for 30 seconds in the flame of a Fisher burner (about 800° F.) in open air. Two strips of the resin alone burned 75 and 70 seconds, respectively. Identical strips including 180 parts by weight of sodium bicarbonate burned for 25 and 40 seconds, respectively before self-extinguishing.

In another test 180 parts by weight of sodium bicarbonate was milled into 100 parts by weight of General Electric SE 404 silicone elastomer gum on a conventional rubber mill. About one-half percent of dicumyl peroxide carried on about one-half percent calcium carbonate was milled into this mixture and the gum was cured in a mold at about 300° F. for about 30 minutes. Although no quantitative tests were made it was noted that the material bearing 180 parts by weight of sodium bicarbonate burned at a considerably lower rate than the cured silicone gum without addition of sodium bicarbonate.

It will be apparent to one skilled in the art that many modifications and variations can be made in practice of the principles of this invention, the composition set forth hereinabove merely being exemplary of practice of this invention. Thus, for example, silicone resins substantially free of acid and curable at a temperature substantially below the decomposition temperature of sodium bicarbonate, other than those specifically mentioned can be employed. It will also be apparent that other strengthening fillers and the like than specifically mentioned can be employed along with the sodium bicarbonate.

What is claimed is:

1. In combination, a device having a coating:
   said device comprising a metal element with said coating disposed covering said metal element;
   said coating comprising a cured silicone elastomer having the characteristics of being curable at a temperature below the decomposition temperature of sodium bicarbonate and being substantially free of acid, and sodium bicarbonate powder uniformly dispersed within said silicone elastomer in the range of from about 50 to 180 parts by weight relative to 100 parts of said silicone elastomer.

* * * * *